US007484746B2

(12) United States Patent
Mills

(10) Patent No.: US 7,484,746 B2
(45) Date of Patent: Feb. 3, 2009

(54) WHEELED CONVEYANCE

(76) Inventor: Christopher James Mills, 9 Acre Close, Headington, Oxford, Oxfordshire OX3 7FO (GB)

( * ) Notice: Subject to any disclaimer, the term of this patent is extended or adjusted under 35 U.S.C. 154(b) by 399 days.

(21) Appl. No.: 10/518,529

(22) PCT Filed: Jun. 3, 2003

(86) PCT No.: PCT/GB03/02414

§ 371 (c)(1),
(2), (4) Date: Dec. 6, 2005

(87) PCT Pub. No.: WO04/000189

PCT Pub. Date: Dec. 31, 2003

(65) Prior Publication Data

US 2006/0151982 A1 Jul. 13, 2006

(30) Foreign Application Priority Data

Jun. 20, 2002 (GB) ................................ 0214223.0

(51) Int. Cl.
*B60G 3/12* (2006.01)

(52) U.S. Cl. ........................... 280/124.128; 280/304.1; 280/647; 180/907

(58) Field of Classification Search .......... 280/124.128, 280/304.1, 647, 755, 250.1; 180/907
See application file for complete search history.

(56) References Cited

U.S. PATENT DOCUMENTS

| | | | | |
|---|---|---|---|---|
| 5,772,237 | A | 6/1998 | Finch et al. | |
| 6,196,343 | B1 * | 3/2001 | Strautnieks | 180/22 |
| 6,357,776 | B1 * | 3/2002 | Goertzen et al. | 280/304.1 |
| 6,845,996 | B2 * | 1/2005 | Cheng | 280/124.179 |
| 7,264,272 | B2 * | 9/2007 | Mulhern et al. | 280/755 |
| 7,316,282 | B2 * | 1/2008 | Mulhern et al. | 180/65.1 |
| 2004/0060748 | A1 * | 4/2004 | Molnar | 180/65.1 |
| 2004/0173983 | A1 * | 9/2004 | Cheng | 280/124.1 |

FOREIGN PATENT DOCUMENTS

| | | |
|---|---|---|
| EP | 0714648 | 6/1996 |
| WO | 9415567 | 7/1994 |
| WO | 9615752 | 5/1996 |

OTHER PUBLICATIONS

Inernational Search Report Sep. 11, 2003.

* cited by examiner

*Primary Examiner*—Toan C To
(74) *Attorney, Agent, or Firm*—Ira S. Dorman

(57) ABSTRACT

A wheeled conveyance comprising a chassis (4), support means for a load mounted on the chassis (4), a suspension assembly mounted on the chassis (4), and at least one shock absorber means (38) acting on at least part of the suspension assembly and adapted and arranged to limit tilting of the chassis (4) relative to at least part of the suspension assembly under dynamic load conditions tending to produce such tilting. The suspension assembly comprises spring means (32) and suspension arms pivotably mounted on the chassis (4) and extending in forward and rearward directions in the region of opposite sides of the chassis (4). Each suspension arm has a wheel (16, 26) rotatably mounted at the free end.

20 Claims, 6 Drawing Sheets

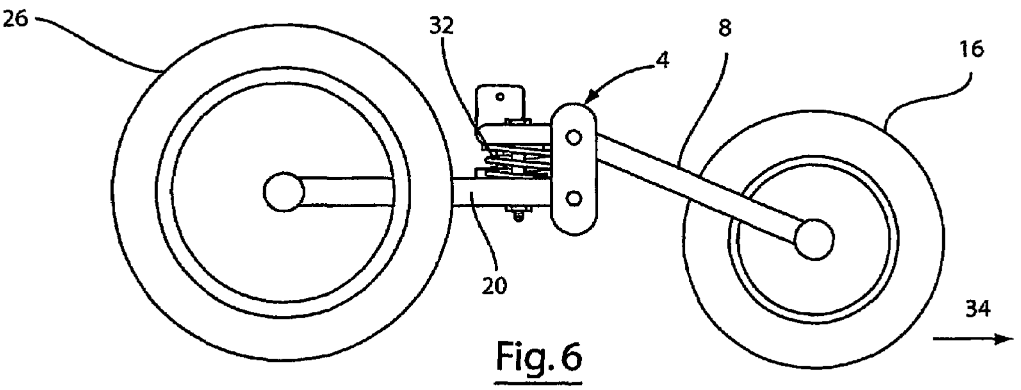
Fig. 6
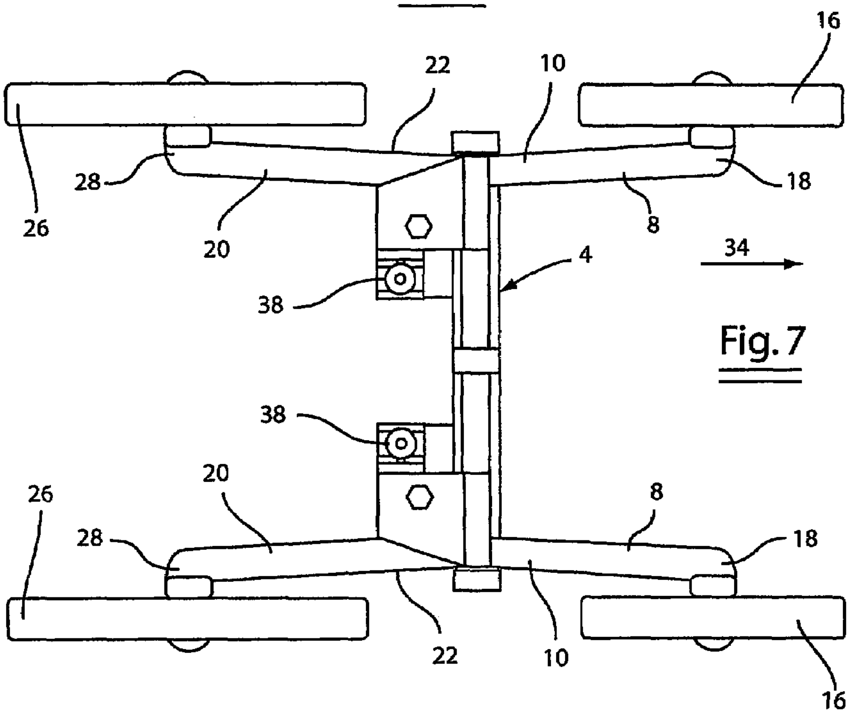
Fig. 7
fig. 8
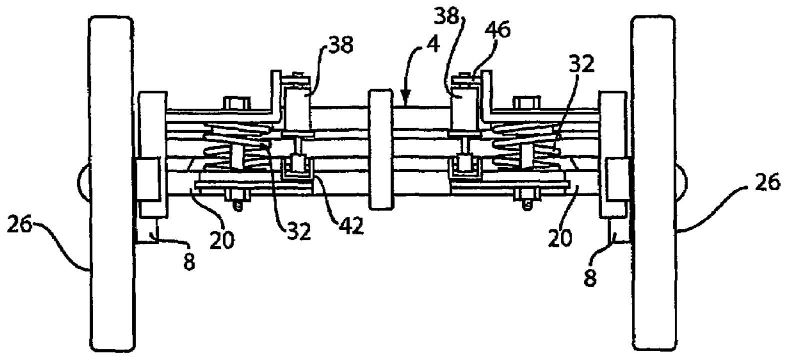

WHEELED CONVEYANCE

BACKGROUND OF THE INVENTION

The present invention relates to a wheeled conveyance, for example a self-propelled wheeled conveyance such as a motorised wheelchair, or a push-chair or wheelchair.

Self-propelled wheeled conveyances, in the form of motorised wheelchairs, are well known in which a chassis is provided with a seat for receiving a person to be transported and with two front wheels and two rear wheels. Two of the wheels (usually the rear wheels) are independently driven by separate battery-powered electric motors and the other two wheels are arranged to swivel independently. The wheels may be provided with a suspension assembly.

Steering and motion control are effected by means of a manually-operated controller, such as a joystick, which selectively controls the two electric motors. A dead man's handle arrangement is usually built into the manually-operated controller, such that when a user releases the controller, the wheelchair immediately brakes and comes to a halt.

Motorised wheelchairs have stability problems associated therewith when front wheels drop into a sudden dip, such as over a kerb or into a pothole, or when descending a slope, particularly when coming to a standstill. Such a slope may, in practice, have an angle of as great as twenty degrees.

If a user releases the controller, such as the joystick, when the wheelchair is moving, the wheelchair in coming to an immediate halt throws the weight forward when doing so. This is disadvantageous and in severe conditions can result in overturning of the wheelchair, particularly when descending a slope. The problem is exacerbated by the fact that such wheelchairs have a relatively short wheelbase and a relatively high centre of gravity. In some situations the height of the centre of gravity is increased by heavy batteries, which are used to power the wheelchair, being mounted in the chassis beneath the seat.

The problem is exacerbated with a wheelchair incorporating a suspension assembly which permits the load to tilt forward, thereby enabling the centre of gravity to move marginally forward also.

Problems in reverse arise with non-powered push-chairs and wheelchairs with suspension when the chair is tilted backwards to effect steering or to mount a large obstacle. Downwards pressure on the pushing handle must take up suspension movement before the front wheels lift off the ground. This is less precise than for a rigid chair.

BRIEF SUMMARY OF THE INVENTION

It is an object of the present invention to overcome or minimise these problems.

According to the present invention there is provided a wheeled conveyance comprising: a chassis; support means for a load mounted on the chassis; a suspension assembly mounted on the chassis and comprising suspension arms pivotably mounted on the chassis and extending in forward and rearward directions in the region of opposite sides of the chassis, each suspension arm having a wheel rotatably mounted at the free end thereof, and two separate spring means, one disposed in the region of each side of the chassis, the free ends of the forwardly and rearwardly extending suspension arms being arranged to tend to pivot towards each other by means of the two separate spring means being provided between, and acting on, the forwardly and rearwardly extending suspension arms; and two shock absorber means separately cooperating between the chassis and each of the suspension arms extending in the forward direction, wherein the two shock absorber means are provided in a substantially horizontal plane so as to limit and dampen tilting of the chassis relative to at least part of the suspension assembly under dynamic load conditions tending to produce such tilting whilst upward and downward movement of the wheels with the suspension arms is substantially uninhibited thereby in the absence of tilting motion of the chassis.

The wheels mounted at the free ends of one of the forwardly extending and rearwardly extending suspension arms may be adapted to swivel about swivel means, for example about a generally upright axis, such as independently of one another.

The wheels provided with swivel means may be provided with limiting means permitting swivelling through a predetermined limited range.

The wheeled conveyance may be self-propelled or may be non-powered.

The self-propelled wheeled conveyance may comprise a motorised wheelchair, having a support means comprising a seat, and a load such as a person to be transported.

Where the wheeled conveyance is self-propelled, the wheels mounted at the free ends of the suspension arms extending in the rearward direction may each be motor-driven and the wheels mounted at the free ends of the suspension arms extending in the forward direction may be provided with swivel means adapted to allow the wheels to swivel.

Alternatively, the wheels mounted at the free ends of the suspension arms extending in the forward direction may each be motor-driven and the wheels mounted at the free ends of the suspension arms extending in the rearward direction may be provided with swivel means adapted to allow the wheels to swivel.

The motor-driven wheels may be powered by separate motors, which may be electric motors, which may be powered by one or more batteries which may be mounted on the chassis.

A manually-operated controller, such as a joystick, may be provided for controlling the motors whereby motion and steering of the conveyance is controlled.

The two shock absorber means may be provided with adjustment means to effect a desired extent of limitation of the tilting of the chassis.

The two shock absorber means may be provided with adjustment means adapted to substantially minimise tilting of the chassis.

Each of the two shock absorber means may be of elongate telescopic form, having one end thereof pivotably secured to the chassis and an opposite end thereof pivotably secured to the associated forwardly extending suspension arm or to a strut extending upwardly from the associated forwardly extending suspension arm. Each of the two shock absorber means of elongate telescopic form may be adapted to pivot during corresponding pivoting of its associated forwardly extending suspension arm.

The two shock absorber means may be arranged to operate simultaneously and collectively to limit the forward tilting of the chassis, with each shock absorber means acting independently on its associated forwardly extending suspension arm.

BRIEF DESCRIPTION OF THE SEVERAL VIEWS OF THE DRAWINGS

For a better understanding of the present invention and to show more clearly how it may be carried into effect, reference will now be made, by way of example, to the accompanying drawings in which:

FIG. 6 is a side view of an embodiment of a chassis forming part of a non-powered wheeled conveyance;

FIG. 7 is a top plan view of the wheeled conveyance chassis of FIG. 6; and FIG. 8 is an end view of the wheeled conveyance chassis of FIGS. 6 and 7.

DETAILED DESCRIPTION OF THE INVENTION

Figure 1:
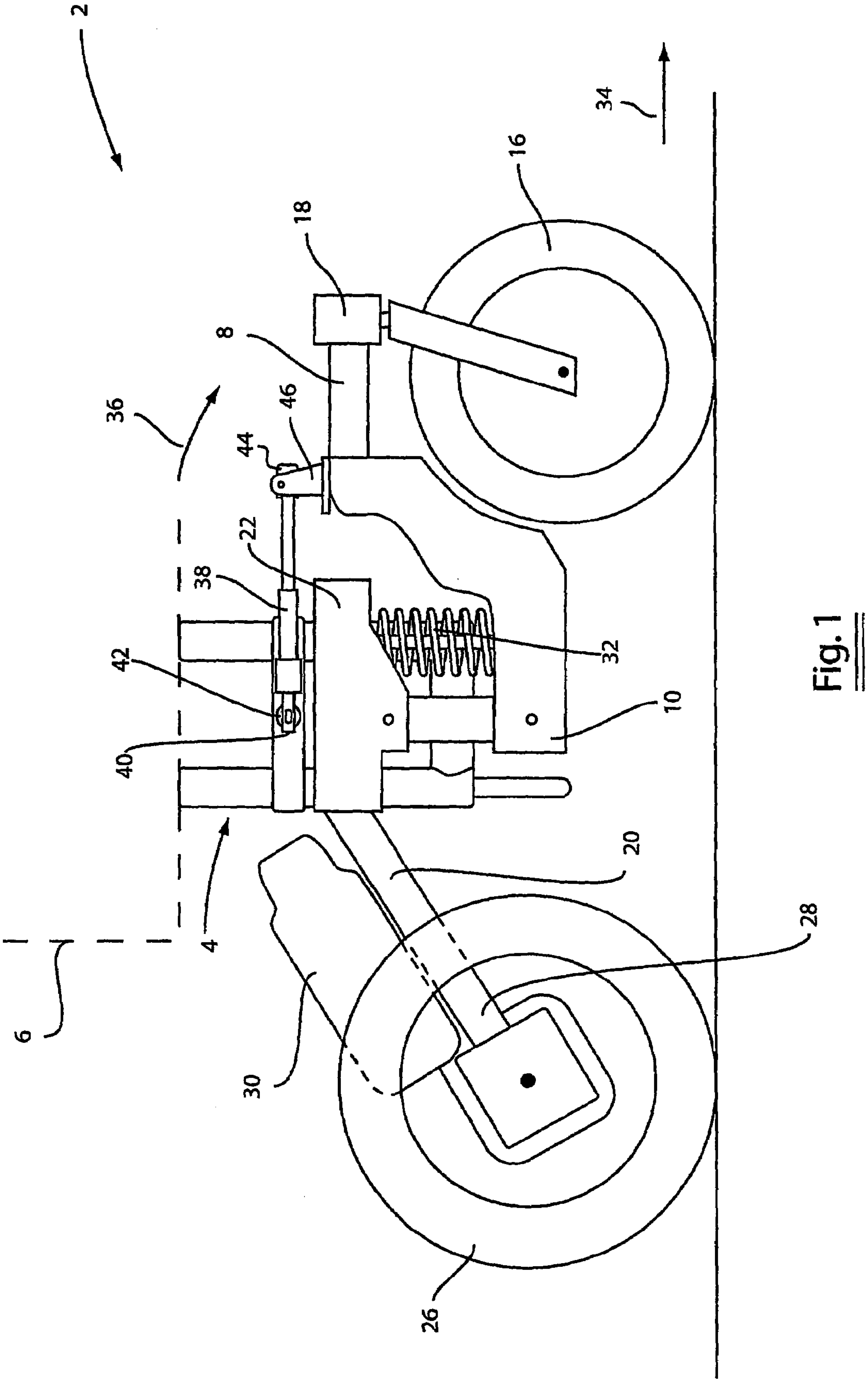
FIG. 1 is a side view of an embodiment of a self-propelled wheeled conveyance according to the present invention, in the form of a motorised wheelchair.
Figure 2:
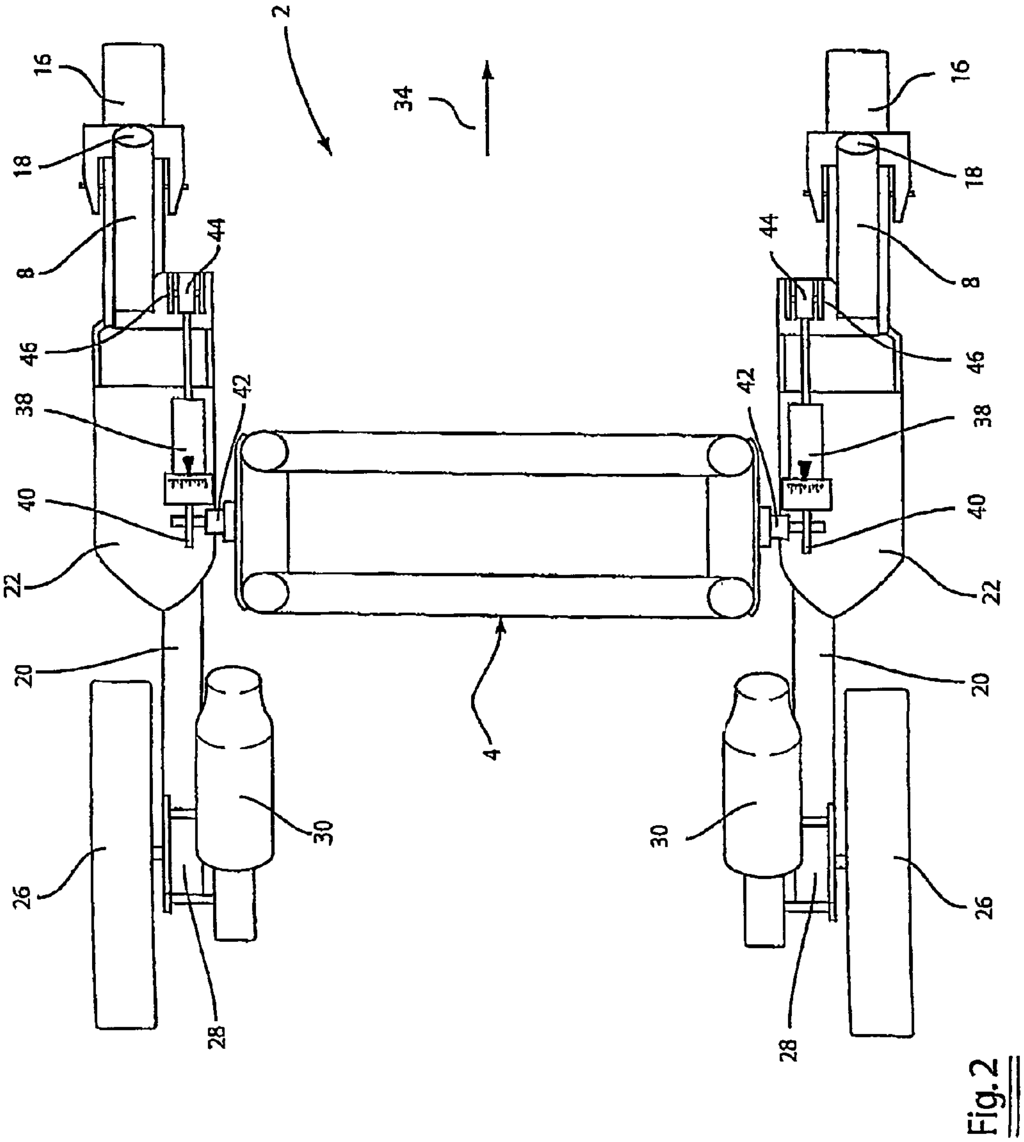
FIG. 2 is a top plan view of the self-propelled wheeled conveyance of FIG. 1.
Figure 3:
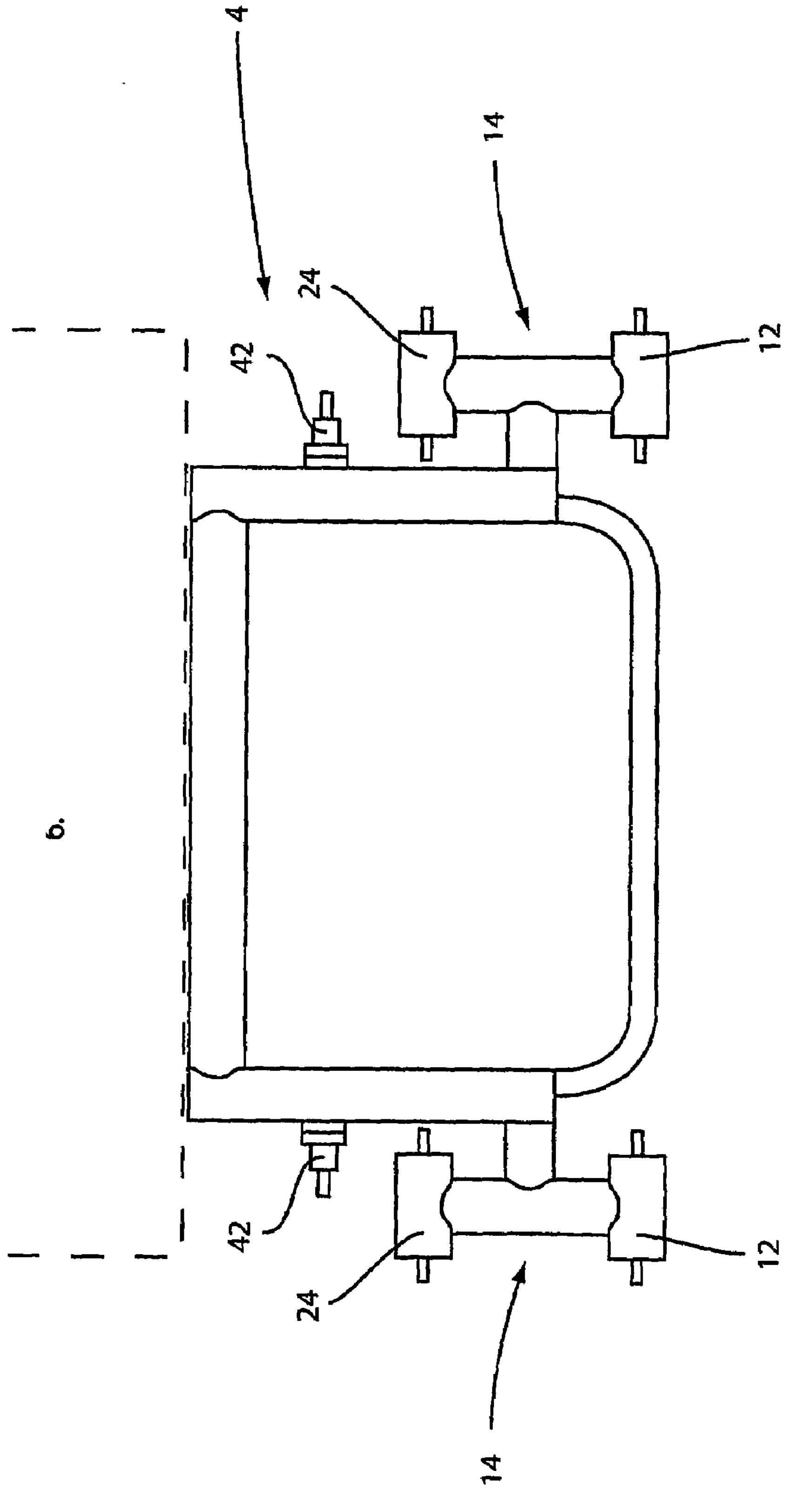
FIG. 3 is an end view of a chassis for use in the self-propelled wheeled conveyance of FIGS. 1 and 2.

Referring to FIGS. 1, 2 and 3, a motorised wheelchair 2 has a tubular metal chassis 4, which is shown in detail in FIG. 3, on which is secured a seat 6 for supporting a person to be transported in the wheelchair.

A suspension assembly is mounted on the chassis 4 and comprises two suspension arms 8 pivotably mounted at ends 10 thereof on lower portions 12 of T-shaped brackets 14 provided at opposite sides of the chassis 4. The suspension arms 8 extend in a forward direction and have ground-engaging wheels 16, rotatably mounted and arranged to swivel about a generally upright axis, at free ends 18 thereof.

Two further suspension arms 20 are pivotably mounted at ends 22 thereof on upper portions 24 of the T-shaped brackets 14 at opposite sides of the chassis 4. The suspension arms 20 extend in a rearward direction and have ground-engaging wheels 26 rotatably mounted at free ends 28 thereof. Each wheel 26 is independently driven by a separate electric motor 30 mounted on each of the suspension arms 20.

The electric motors 30 are energised by one or more batteries (not shown) mounted on the chassis 4, such as below the seat 6. Power to the motors 30 is independently controlled through a joystick controller (not shown) of well-known form and by means of which steering and motion control of the wheelchair are effected.

Two springs 32 are provided, only one of which is shown in the drawings.

The springs 32 are disposed in the region of each side of the chassis 4 and act between the forwardly and rearwardly extending suspension arms 8 and 20 in such a way that the free ends 18 and 28 of the suspension arms 8 and 20 tend to pivot towards each other.

The suspension arms 8, 20 and the springs 32 may incorporate features as described and claimed in EP-A-0 836 979.

The wheelchair 2 is arranged to move forward in the direction of arrow 34, the swivelling wheels 16 being at the front.

If the joystick controller (not shown) is released while the wheelchair 2 is in motion, a dead man's handle arrangement incorporated in the controller shuts off the power to the motors 30 and the wheelchair is braked and comes to an immediate halt. When this happens, the chassis 4 will tend to tilt forward as shown by the arrow 36. This is undesirable and in severe conditions, particularly when the wheelchair 2 is located on downward-sloping ground, could result in overturning of the wheelchair 2. Such tendency for the chassis 4 to tilt forward may also occur when the wheelchair descends a gradient, or drops over a kerb or into a pothole, and is reduced or minimised in the present invention.

A shock absorber 38 is provided at each side of the chassis 4. The shock absorbers 38 are suitably of elongate telescopic form and each has one end 40 thereof pivotably secured to a mounting 42 on the chassis 4 and an opposite end 44 pivotably secured to a strut 46 extending upwardly from an associated forwardly extending suspension arm 8. The shock absorbers 38 are disposed in a substantially horizontal plane.

The two shock absorbers 38 act simultaneously to damp any forward tilting movement of the chassis 4, such as when power to the motors 30 is interrupted and the wheelchair 2 comes to an abrupt halt. The shock absorbers 38 are preferably adjustable whereby their damping action can be tuned such that forward tilting movement of the chassis 4 is minimised.

Although the two shock absorbers 38 operate simultaneously and collectively to limit the forward tilting movement of the chassis 4, each shock absorber 38 acts independently on its associated suspension arm 8 as when the suspension travels along an irregular surface.

The shock absorbers 38 undergo pivoting about their ends 40, 44 during corresponding pivoting of their associated forwardly extending suspension arms 8. Upward and downward movement of the wheels 16 on the suspension arms 8 is substantially uninhibited by the shock absorbers 38 in the absence of forward tilting motion of the chassis 4.

The shock absorbers 38 are arranged such that articulation of the suspension system is retained. Such articulation is important to ensure that the driving wheels 26 maintain contact with ground surface. If a driving wheel 26 were to undesirably leave the ground, the wheelchair 2 would veer away from its intended direction of travel.

Figure 4:
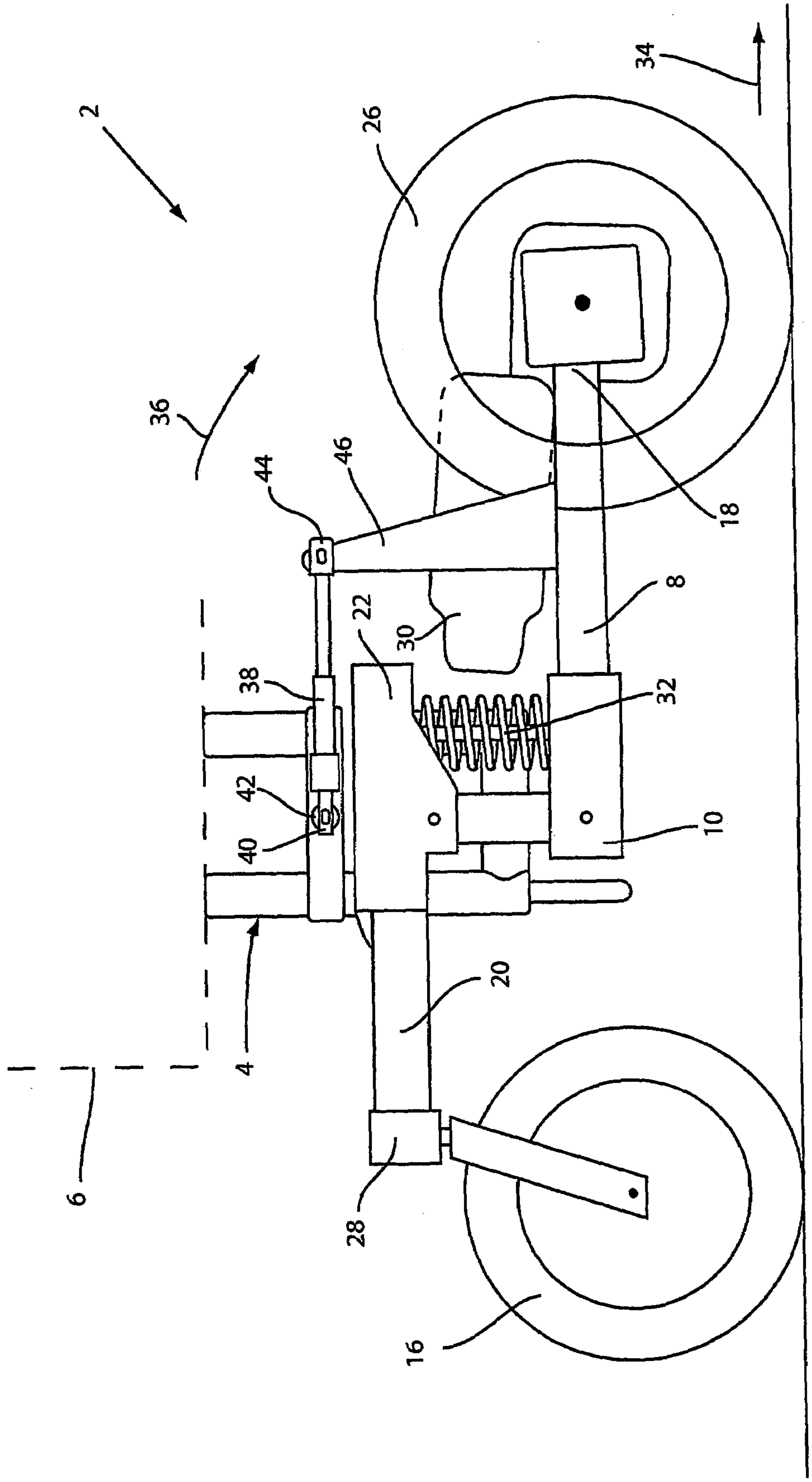
FIG. 4 is a side view of another embodiment of a self-propelled wheeled conveyance according to the present invention, in the form of a motorised wheelchair.
Figure 5:
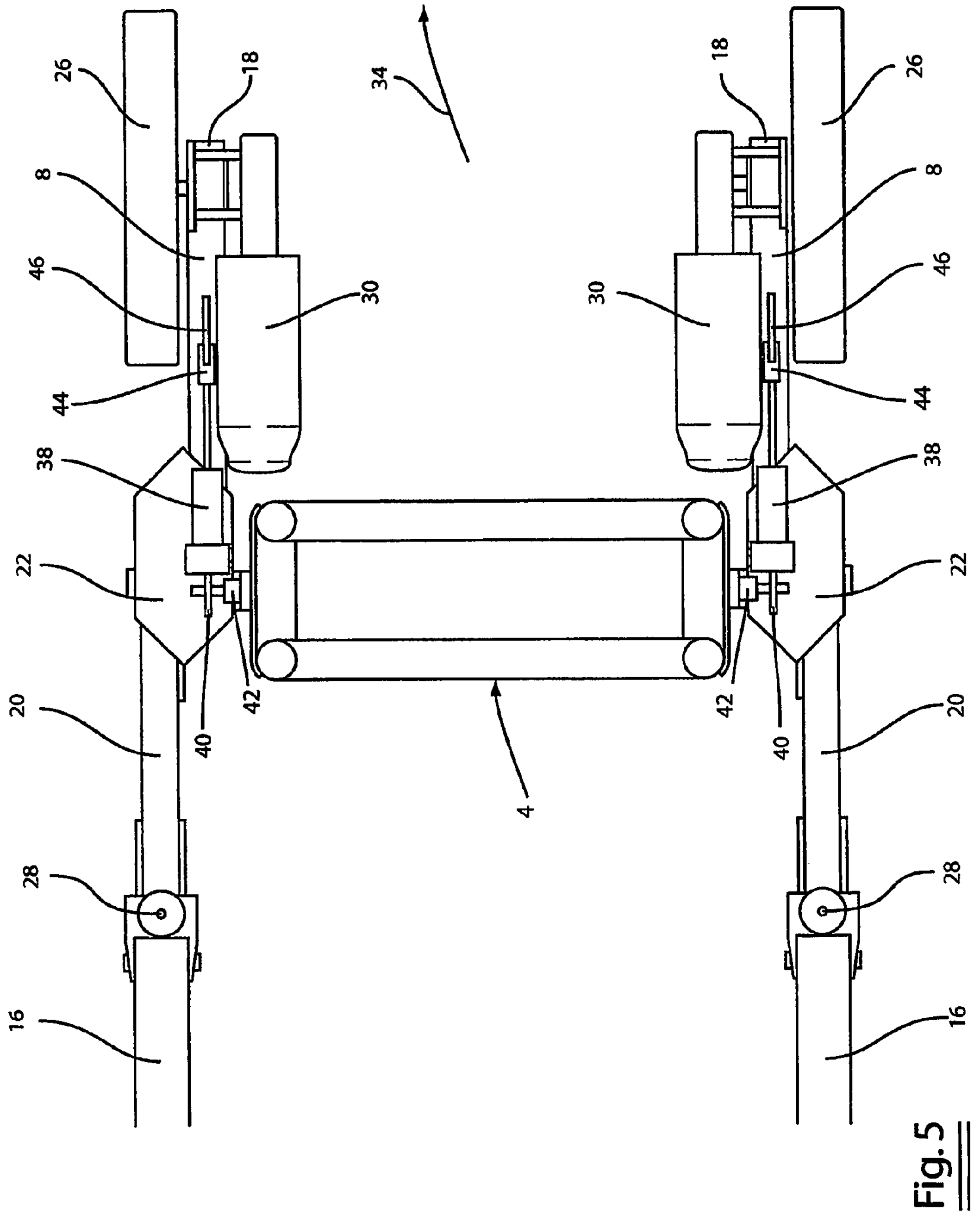
FIG. 5 is a top plan view of the self-propelled wheeled conveyance of FIG. 4.

FIGS. 4 and 5 show an alternative embodiment of a motorised wheelchair according to the present invention. The motorised wheelchair 2 in FIGS. 4 and 5 differs from that of FIGS. 1, 2 and 3 in that the motor-driven wheels 26 are provided at the front of the wheelchair and the swivelling wheels 16 are provided at the rear of the wheelchair.

In FIGS. 4 and 5, parts fulfilling the same or similar functions as those in FIGS. 1, 2 and 3 are given the same reference numerals as those in FIGS. 1, 2 and 3.

Accordingly, the motorised wheelchair 2 shown in FIGS. 4 and 5 has a tubular metal chassis 4, constructed as shown in FIG. 3, and on which is secured a seat 6 for supporting a person to be transported in the wheelchair.

A suspension assembly is mounted on the chassis 4 and comprises two suspension arms 8 pivotably mounted at ends 10 thereof at opposite sides of the chassis 4. The suspension arms 8 extend in a forward direction and have wheels 26 rotatably mounted at free ends 18 thereof. Each wheel 26 is independently driven by a separate electric motor 30 mounted on each of the suspension arms 8.

Two further suspension arms 20 are pivotably mounted at ends 22 thereof at opposite sides of the chassis 4. The suspension arms 20 extend in a rearward direction and have wheels 16, rotatably mounted and arranged to swivel, at free ends 28 thereof. Swivelling of the wheels 16 is desirably limited to a predetermined range, for optimised steering control of the wheelchair.

The electric motors 30 are energised by one or more batteries (not shown) mounted on the chassis 4, such as below the seat 6. Power to the motors 30 is independently controlled through a joystick controller (not shown) and by means of which steering and motion control of the wheelchair are effected.

Two springs 32 are provided, only one of which is shown in FIG. 4. The springs 32 are disposed in the region of each side of the chassis 4 and act between the forwardly and rearwardly extending suspension arms 8 and 20 in such a way that the free ends 18 and 28 of the suspension arms 8 and 20 tend to pivot towards each other.

The wheelchair 2 is arranged to move forward in the direction of arrow 34.

A shock absorber 38 is provided at each side of the chassis 4. The shock absorbers 38 are suitably of elongate telescopic form and each has one end 40 thereof pivotably secured to a mounting 42 on the chassis 4 and an opposite end 44 pivotably secured to a strut 46 extending upwardly from an associated forwardly extending suspension arm 8. The shock absorbers 38 are disposed in a substantially horizontal plane.

The shock absorbers 38 act in exactly the same way as those previously described with reference to FIGS. 1 and 2, to minimise forward tilting movement of the chassis 4 in the direction of arrow 36, such as when power to the motors 30 is interrupted and the wheelchair 2 comes to an abrupt halt, or when the wheelchair 2 descends a gradient, or drops over a kerb or into a pothole.

FIGS. 6, 7 and 8 show an embodiment of a chassis of a non-powered push-chair or wheelchair. The push-chair or wheelchair chassis 2 in FIGS. 6 to 8 differs from that of FIGS. 1 to 3 in that the wheels are not swivelable and the shock absorber 38 is mounted in an upright configuration.

In FIGS. 6, 7 and 8, parts fulfilling the same or similar functions as those in FIGS. 1, 2 and 3 are given the same reference numerals as those in FIGS. 1, 2 and 3.

Accordingly, the wheeled conveyance shown in FIGS. 6 to 8 has a tubular metal chassis 4 adapted to receive a seat (not shown) for supporting an infant or person to be transported. A seat or other support means can readily be mounted on the chassis 4 in a manner similar to that shown in FIGS. 1, 3 and 4.

A suspension assembly is mounted on the chassis 4 and comprises two suspension arms 8 pivotably mounted at ends 10 thereof at opposite sides of the chassis 4. The suspension arms 8 extend in a forward direction and have wheels 16 rotatably mounted at free ends 18 thereof.

Two further suspension arms 20 are pivotably mounted at ends 22 thereof at opposite sides of the chassis 4. The suspension arms 20 extend in a rearward direction and have wheels 26 rotatably mounted at free ends 28 thereof.

If desired, one of the sets of wheels 26 or 16 may be able to swivel about an upright axis.

Two springs 32 are provided, the springs being disposed in the region of each side of the chassis 4 and act between the forwardly and rearwardly extending suspension arms 8 and 20 in such a way that the free ends 18 and 28 of the suspension arms 8 and 20 tend to pivot towards each other.

The wheeled conveyance 2 is adapted to move forward in the direction of arrow 34.

A shock absorber 38 is provided at each side of the chassis 4. The shock absorbers 38 are suitably of elongate telescopic form and each has one end pivotably secured to a mounting 42 on the rearwardly extending suspension arm 20 and an opposite end pivotably secured to a mounting 46 provided on the forwardly extending suspension arm 8. The shock absorbers 38 are in a substantially upright configuration.

The shock absorbers 38 of the wheeled conveyance of FIGS. 6 to 8 act to minimise forward and rearward tilting movement of the chassis 4 permitted by compressing the suspension such as when the conveyance is tilted to facilitate steering or to climb a large obstacle.

The invention claimed is:

1. A wheeled conveyance (2) comprising: a chassis (4); support means for a load mounted on the chassis (4); a suspension assembly mounted on the chassis (4) and comprising suspension arms (8, 20) pivotably mounted on the chassis (4) and extending in forward and rearward directions in the region of opposite sides of the chassis (4), each suspension arm having a wheel (16, 26) rotatably mounted at the free end (18, 28) thereof, and two separate spring means (32), one disposed in the region of each side of the chassis (4), the free ends (18, 28) of the forwardly and rearwardly extending suspension arms (8, 20) being arranged to tend to pivot towards each other by means of the two separate spring means (32) being provided between, and acting on, the forwardly and rearwardly extending suspension arms (8, 20); and two shock absorber means (38) separately cooperating between the chassis (4) and each of the suspension arms (8, 20) extending in the forward direction, wherein the two shock absorber means (38) are provided in a substantially horizontal plane so as to limit and dampen tilting of the chassis (4) relative to at least part of the suspension assembly under dynamic load conditions tending to produce such tilting, upward and downward movement of the wheels (16, 26) with the suspension arms (8, 20) being substantially uninhibited by said two shock absorber means (38) in the absence of tilting motion of the chassis (4).

2. A wheeled conveyance as claimed in claim 1, wherein the wheels (16, 26) mounted at the free ends (18, 28) of one of the forwardly extending and rearwardly extending suspension arms (8, 20) are provided with swivel means arranged such that the wheels (16, 26) are adapted to swivel independently of one another.

3. A wheeled conveyance as claimed in claim 1, wherein the wheels (16, 26) mounted at the free ends (18, 28) of one of the forwardly extending and rearwardly extending suspension arms (8, 20) are provided with swivel means arranged such that the wheels (16, 26) are adapted to swivel about a generally upright axis.

4. A wheeled conveyance as claimed in claim 2, wherein the wheels (16, 26) provided with swivel means are further provided with limiting means permitting swivelling through a predetermined limited range.

5. A wheeled conveyance as claimed in claim 1, wherein the wheeled conveyance is non-powered.

6. A wheeled conveyance as claimed in claim 1, wherein the wheeled conveyance is self-propelled.

7. A wheeled conveyance as claimed in claim 6, wherein the self-propelled wheeled conveyance comprises a motorised wheelchair, having a support means comprising a seat (6).

8. A wheeled conveyance as claimed in claim 6 wherein the wheels (16) mounted at the free ends (28) of the suspension arms (20) extending in the rearward direction are each motor-driven and the wheels (26) mounted at the free ends (18) of the suspension arms (8) extending in the forward direction are provided with swivel means adapted to allow the wheels (26) to swivel.

9. A wheeled conveyance as claimed in claim 6, wherein the wheels (26) mounted at the free ends (18) of the suspension arms (8) extending in the forward direction are each motor-driven and the wheels (16) mounted at the free ends (28) of the suspension arms (20) extending in the rearward direction are provided with swivel means adapted to allow the wheels (16) to swivel.

10. A wheeled conveyance as claimed in claim 8, wherein the motor-driven wheels are powered by separate motors (30).

11. A wheeled conveyance as claimed in claim 10, wherein the separate motors are electric motors (30).

12. A wheeled conveyance as claimed in claim 9, wherein the motor-driven wheels are powered by separate motors (30).

13. A wheeled conveyance as claimed in claim 12, wherein the separate motors are electric motors (30).

14. A wheeled conveyance as claimed in claim 1, wherein the two shock absorber means (38) are provided with adjustment means to effect a desired extent of limitation of the tilting of the chassis (4).

15. A wheeled conveyance as claimed in claim 1, wherein the two shock absorber means (38) are provided with adjustment means adapted to substantially minimise tilting of the chassis (4).

16. A wheeled conveyance as claimed in claim 1, wherein each of the two shock absorber means (38) are of elongate telescopic form, having one end (40) thereof pivotably secured to the chassis (4) and an opposite end (44) thereof pivotably secured to the associated forwardly extending suspension arm (8).

17. A wheeled conveyance as claimed in claim 16, wherein the pivotably secured ends (40, 44) of each of the shock absorber means of elongate telescopic form are adapted to pivot during corresponding pivoting of its associated forwardly extending suspension arm (8).

18. A wheeled conveyance as claimed in claim 1, wherein each of the two shock absorber means (38) are of elongate telescopic form, having one end (40) thereof pivotably secured to the chassis (4) and an opposite end (44) thereof pivotably secured to a strut (46) extending upwardly from the associated forwardly extending suspension arm (8).

19. A wheeled conveyance as claimed in claim 18, wherein the pivotably secured ends (40, 44) of each of the shock absorber means of elongate telescopic form are adapted to pivot during corresponding pivoting of its associated forwardly extending suspension arm (8).

20. A wheeled conveyance as claimed in claim 1, wherein the two shock absorber means (38) are adapted to operate simultaneously and collectively to limit the forward tilting of the chassis (4), with each shock absorber means acting independently on its associated forwardly extending suspension arm (8).

* * * * *